United States Patent
Lynch et al.

(10) Patent No.: US 7,078,077 B2
(45) Date of Patent: *Jul. 18, 2006

(54) CARBAMATED POLYOLS, AND COMPOSITIONS AND METHODS USING THE SAME

(75) Inventors: Paul J. Lynch, Cincinnati, OH (US);
Michael T. List, Milford, OH (US);
Ron D. Taylor, Loveland, OH (US);
Kareem Kaleem, Loveland, OH (US);
Youssef Moussa, Loveland, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 311 days.

This patent is subject to a terminal disclaimer.

(21) Appl. No.: 10/641,572

(22) Filed: Aug. 15, 2003

(65) Prior Publication Data

US 2004/0224106 A1 Nov. 11, 2004

Related U.S. Application Data

(63) Continuation of application No. 10/431,710, filed on May 8, 2003, now Pat. No. 6,939,592.

(51) Int. Cl.
*B05D 3/02* (2006.01)

(52) U.S. Cl. .................................. 427/388.1
(58) Field of Classification Search .............. None
See application file for complete search history.

(56) References Cited

U.S. PATENT DOCUMENTS

| | | | |
|---|---|---|---|
| 4,081,417 A | 3/1978 | Shen et al. | 260/29.2 EP |
| 5,089,561 A | 2/1992 | Forgione et al. | 525/127 |
| 5,474,811 A | 12/1995 | Rehfuss et al. | 427/407.1 |
| 5,536,835 A * | 7/1996 | Rardon et al. | 544/196 |
| 5,665,433 A | 9/1997 | Moussa et al. | 427/377 |
| 5,684,072 A | 11/1997 | Rardon et al. | 524/199 |
| 5,719,237 A | 2/1998 | Rehfuss et al. | 525/419 |
| 5,726,244 A * | 3/1998 | McGee et al. | 525/78 |
| 5,814,410 A | 9/1998 | Singer et al. | 428/423.1 |
| 6,037,441 A * | 3/2000 | Ohrbom et al. | 528/367 |
| 6,040,062 A | 3/2000 | McGee et al. | 428/500 |
| 6,106,951 A | 8/2000 | Ohrbom et al. | 428/423.1 |
| 6,111,001 A * | 8/2000 | Barancyk et al. | 524/211 |
| 6,147,163 A | 11/2000 | Boisseau et al. | 525/278 |
| 6,541,577 B1 | 4/2003 | Ohrbom et al. | 525/498 |
| 2002/0119320 A1* | 8/2002 | Ramesh et al. | 428/423.1 |

FOREIGN PATENT DOCUMENTS

| | | | |
|---|---|---|---|
| EP | 780455 | * | 6/1997 |
| WO | WO 03/054018 | | 7/2003 |

* cited by examiner

*Primary Examiner*—Erma Cameron
(74) *Attorney, Agent, or Firm*—Diane R. Meyers

(57) ABSTRACT

The present invention is directed to coatings that provide improved retort and tropical decay resistance for use on metal food containers. The coatings generally comprise a carbamated polyol formed by the reaction between a polyol, an alkylene oxide and an alkyl carbamate. A crosslinker reactive with the carbamate functionality is used to react with the carbamate moiety. Methods for improving retort resistance and resistance to tropical decay are also disclosed, as are substrates coated with the present compositions.

20 Claims, No Drawings

CARBAMATED POLYOLS, AND COMPOSITIONS AND METHODS USING THE SAME

CROSS-REFERENCE TO RELATED APPLICATION

This patent application is a continuation of U.S. patent application Ser. No. 10/431,710, filed May 8, 2003, now U.S. Pat. No. 6,939,592, the contents of which are hereby incorporated by reference.

FIELD OF THE INVENTION

The present invention is related to coatings and methods for using the same that improve the physical characteristics of coated containers. More specifically, improved steam retort resistance, as well as improved tropical decay resistance, can be achieved according to the present invention.

BACKGROUND OF THE INVENTION

Coating compositions for containers used in the food and beverage industries are generally expected to meet a number of relatively stringent requirements in order to be commercially acceptable. The coating should adhere well to the base material, such as a metal, and should possess flexibility, extensibility, and adhesion characteristics so as to withstand the processing of the container itself. The coating should also be able to resist the heat, steam and pressure conditions often encountered during processing of the container and its contents. Additionally, the coating itself should not affect the taste of a food or beverage if it is put inside the container. Finally, the coating should be able to withstand degradation during storage of the cans, particularly when the cans are subjected to high ambient temperature and humidity.

Food container coatings are subjected to steam processing and prolonged bake cycles. Steam processing often causes a defect in container coatings called "blush", which is a haziness in the film thought to be caused by absorption of water. Blush is particularly evident with container coatings that are subjected to high temperature and high humidity conditions during steam processing. Another form of coating degradation called "tropical decay", can also occur when cans, filled or unfilled, are stored in conditions of high ambient temperature and humidity.

Container coating compositions having improved resistance to defects caused by steam processing, such as water spotting, decreased solvent resistance, decreased abrasion resistance and decreased gloss retention, are desired, as are coatings that further offer resistance to tropical decay.

SUMMARY OF THE INVENTION

The present invention is directed to food container coatings comprising a carbamated polyol and a crosslinker therefor. The coatings may also comprise a film-forming resin and one or more standard coating additives. Methods for using these coatings to improve performance are also within the scope of the invention, as are food containers coated with these coatings.

The coatings of the present invention provide numerous advantages over other coatings known in the art. For example, the present coatings have excellent retort resistance, without sacrificing flexibility. As used herein, the term "retort resistance" refers to the ability to resist or at least minimize discoloration, water spotting, loss of solvent resistance, loss of abrasion resistance and/or loss of gloss. In addition to withstanding the high temperatures and pressures of retort, the present coatings show enhanced resistance to tropical decay. "Tropical decay" refers to the haziness, discoloration, loss of gloss, loss of solvent resistance and/or decreased abrasion resistance that a coating undergoes upon exposure to high ambient temperature and humidity. In addition, the present coatings are low in volatile organic content, which is desirable from an environmental standpoint.

Another particular advantage of the present coatings is that the carbamated polyol is water dispersible. Often, can coating components that are inherently water dispersible have a negative impact on retort resistance, since such compounds typically exhibit water sensitivity. It was surprising that the present polyol could be dispersed in water without affecting the retort resistance. It is believed that this is due to the formation of urethane linkages between the carbamated polyol and the crosslinker, although the inventors do not wish to be bound by any mechanism.

DETAILED DESCRIPTION OF THE INVENTION

The present invention is directed to food container coatings comprising at least one carbamated polyol and at least one crosslinker therefor. The carbamated polyols of the present invention are the reaction products of an aromatic and/or aliphatic polyol, an alkylene oxide, and an alkyl carbamate. The crosslinker is selected so as to be reactive with the carbamate functionality on the reaction product.

Any aliphatic or aromatic polyol or combinations thereof can be used according to the present invention. The compounds can have any number of carbon atoms, such as 1 to 20, and any number of hydroxy functional groups, although 2–4 hydroxyl groups are particularly suitable. One or more aromatic rings can be present, and if more than one ring is present, they can be fused and/or unfused. Aromatic diols are particularly suitable. The presence of an aromatic moiety is believed to contribute to the flexibility of the present coatings, as well as the superior retort resistance, although the inventors do not wish to be bound by this. Again, one or more aromatic rings can be present in the aromatic diol, and if more than one ring is present, the rings can be fused and/or unfused. Particularly suitable examples of aromatic diols include bisphenols, such as Bisphenols A, F, E, M, P and Z.

The polyol undergoes chain extension by reaction with at least one alkylene oxide. The alkylene moiety of the alkylene oxide can have any number of carbon atoms, and can be branched or unbranched. Particularly suitable alkylene oxides will be those having from 1 to 10 carbon atoms, such as those having 2 to 4 carbon atoms. Such compounds are widely commercially available.

The polyol can be reacted with the alkylene oxide in any suitable molar ratio. For example, the ratio of aromatic diol to the alkylene oxide can be from 1:1 to 1:10, or even higher. Standard reaction procedures can be used to react the alkylene oxide to one or more of the hydroxyl groups of the polyol, and to further link the alkylene oxide groups to each other for additional chain extension. Alternatively, such products are commercially available, such as from BASF, in their MACOL line of products. A particularly suitable product is one in which six moles of ethylene oxide are reacted with one mole of Bisphenol A.

The polyol/alkylene oxide reaction product or "chain extended polyol" is then further reacted with at least one alkyl carbamate to form the "carbamated polyol" of the present invention. Any number of carbon atoms can be present in the alkyl moiety of the alkyl carbamate, which can be branched or unbranched. Particularly suitable are those alkyl carbamates having 1 to 10 carbon atoms, such as 2 to 4 carbon atoms. Alkyl carbamate compounds are widely commercially available, such as from Cytec Industries, Inc. The molar ratio of chain extended polyol to alkyl carbamate will typically be 1:1.5–4, such as 1:2.

The reaction product of the polyol(s), alkylene oxide(s) and alkyl carbamate(s) according to the present invention can be generally represented by structure (I):

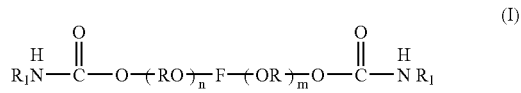

"F" represents the residue of the polyol. As shown in structure (I), the polyol is a diol. It will be understood that more than two groups can be attached to the F, depending on the number of hydroxy groups on F and the other reaction conditions employed. "F" can, for example, comprise one or more aromatic rings. "R" is the alkyl portion of the alkylene oxide. In some embodiments, R will have between 1 and 10 carbon atoms, and in some embodiments, R will have 2 to 4 carbon atoms. The two "R" groups will be the same if only one alkylene oxide is used. If a mixture of alkylene oxides are used, it will be understood that R can be different for each repeating unit (i.e. $-(RO)_n$ and $-(RO)_m$) in the compound. Two carbamate functional groups are located on either end of the compound having structure (I). "$R_1$" can be hydrogen or an alkyl group having 1 to 10 carbons, such as 1 to 4 carbons. Again, the two "$R_1$" groups will be the same if only one alkyl carbamate is used; if a mixture of alkyl carbamates are used, the $R_1$ groups can be the same or different. It will be appreciated that upon reaction of the carbamate with the chain extended polyol, an alcohol will be the by-product; the alcohol will have the same number of carbon atoms as the alkyl group of the carbamate used. The number of alkylene oxide groups that become attached to the polyol, depicted in structure (I) as "n" and "m", will vary depending on the number of moles of alkylene oxide used. For example, if six moles of alkylene oxide are used, the reaction product will predominantly have n equal to 3 and m equal to 3, if 10 moles of alkylene oxide are used, m and n would both predominantly be 5 and so on. It will be appreciated that equal amounts of repeat units derived from the alkylene oxide will not necessarily be attached on either side of the polyol, but rather a distribution will be the result; m and n will typically be equal in the predominant species in the distribution, however. In one embodiment, m and n together are at least 2. While it is possible that only one hydroxyl group of the polyol will react with the alkylene oxide, and some such products will be present in the distribution of reaction products that result, use of a catalyst as discussed below typically ensures that all of the hydroxyl groups on the polyol will react with the alkylene oxide. This is a desirable result, since the carbamated polyols of the present invention, typically having 2 or more carbamate functional groups, will react with the crosslinker to form a three-dimensional network. Upon curing, the coating will have the desirable properties described above, particularly when the coating also comprises an additional film-forming resin, as further discussed below.

A reaction according to the present invention is illustrated in the following scheme (I), wherein the polyol is Bisphenol A, the alkylene oxide is ethylene oxide, 6 moles of ethylene oxide have been reacted with the Bisphenol A so as to attach three alkylene groups on either side of the Bisphenol A and methyl carbamate is the carbamate. Accordingly, methanol is the by-product.

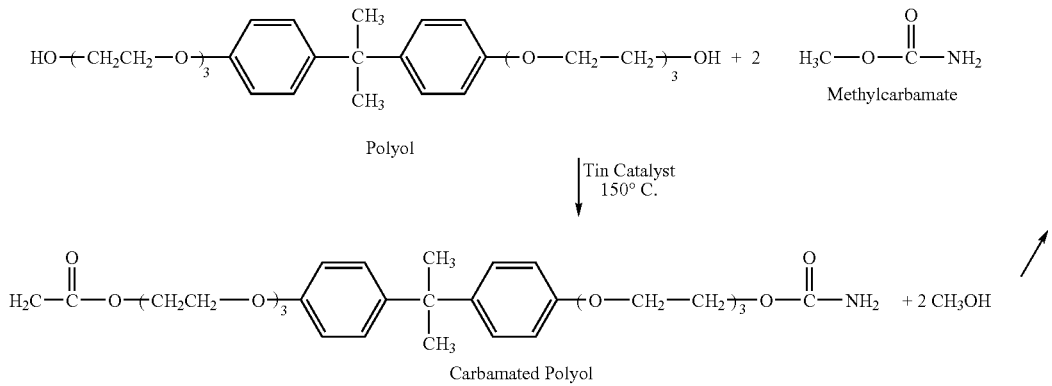

The coating compositions of the present invention further comprise a crosslinker that will react with the carbamate functionality on the carbamated polyol. That is, the crosslinker will have a plurality of functional groups that are reactive with the carbamate group(s) on the carbamated polyol. Such reactive groups include active methylol or methylalkoxy groups on aminoplast crosslinking agents or on other compounds such as phenol/formaldehyde adducts. Examples include melamine formaldehyde resins (including monomeric or polymeric melamine resin and partially or fully alkylated melamine resin) and urea resins (for example methylol ureas, such as urea formaldehyde resin, and alkoxy ureas such as, butylated urea formaldehyde resin). Alkoxylated melamine resins are commercially available from Cytec Specialty Chemicals in their CYMEL line; alkoxylated glycoluril resins are also commercially available from Cytec. "Aminoplast resin" is used to refer to alkoxylated melamine resins and alkoxylated glycoluril resins. In the reaction of the carbamated polyol with an aminoplast resin, the carbamate group reacts with the methylol and/or alkoxy groups on the resin. It will be understood that the reaction between the carbamate groups and the methylol and/or alkoxy groups results in the formation of urethane linkages. The urethane linkages provide resistance to hydrolysis, which means greater retort resistance and resistance to tropical decay.

The coating compositions may further comprise a film-forming resin. In one embodiment, the film-forming resin is one that may crosslink with the carbamated polyol/crosslinker reaction product; such crosslinking is achieved by reaction of the carbamated polyol/crosslinker reaction product and functional groups on the film-forming resin. In another embodiment, the film-forming resin lacks reactive functionality. Mixtures of film-forming resins can be used. Additional crosslinkers can also be used.

Any resin that forms a film can be used according to the present invention, absent compatibility problems. Examples of polymers useful in forming the resin include hydroxyl or carboxylic acid-containing acrylic copolymers, hydroxyl or carboxylic acid containing polyester polymers including alkyds, oligomers and isocyanate or hydroxyl containing polyurethane polymers, and amine or isocyanate-containing polyureas. These polymers are further described in U.S. Pat. No. 5,939,491, col. 7, line 7 to col. 8, line 2; this patent as well as the patents referenced therein, are incorporated by reference herein.

Acrylic polymers are particularly suitable and can comprise any number of acrylic or other ethylenically unsaturated monomers. For example, any combination of the following monomers could be used: acrylic acids, methacrylic acids, methyl acrylic acids, methyl methacrylic acids, butyl acrylate, butyl methacrylate, N-butoxy methyl acrylamide, allyl methacrylate, allyl acrylate, styrene, hydroxyalkyl methacrylates, acrylamides, methacrylamides, N,N-dimethyl acrylamide, N-i-propylacrylamide, butylacrylamide, maleic acid, maleic anhydride, itaconic acid, vinyl acetic acid, allyl acetic acid, methacrylonitriles, acrylonitriles, vinyl toluene, vinyl sulfonic acid, allyl sulfonic acid, vinyl phosphonic acid, vinyl acetate, 2-acrylamido-2-methylpropane sulfonic acid, 2-methacrylamido-2-methylpropane sulfonic acid, styrene sulfonic acid, hydroxyalkyl acrylates, vinyls, vinylidene fluorides, vinyl esters, carboxylethylacrylic acid, sulfoalkyl acrylates, sulfoalkyl methacrylates, allyloxy-2-hydroxypropane sulfonic acid and methacrylamido hydroxypropyl sulfonic acid. One embodiment of the present invention excludes a coating comprising a carbamate-functional grafted acrylic polymer that is the reaction product of first and second acrylic polymers, one of which has carbamate functionality. It will be appreciated that when acrylic is included in the present invention, the carbamated polyol will react with the crosslinker having functional groups reactive with the carbamate; this reaction product may then, in some cases, react with the acrylic. One or more additional crosslinkers that will cure the acrylic can also be used. The carbamated polyol does not react directly with the acrylic; thus, the compositions of the present invention do not comprise acrylic polymers having carbamate functionality appended or grafted directly thereto. The same is true if any other type of film-forming resin or polymer is used.

A "cured coating" and similar terms will be understood as referring to one in which the components react with each other so as to resist melting upon heating.

The compositions of the present invention can further comprise one or more additives typically found in coating compositions, for example, dyes, pigments, extenders, surfactants, fillers, stabilizers, wetting agents, dispersing agents, adhesion promoters, anti-corrosion agents, flow control agents, waxes, lubricants, thixotropic agents, antioxidants, light stabilizers and the like. Suitable wetting agents include, for example, MODAFLOW and MODAFLOW AQ3000 available from UCB Chemicals, ADDITOL XW395 also available from UCB Chemicals, and TAMOL 1124 available from Rohm and Haas. Suitable adhesion promoters include, for example, 2061 and 2063 both available from Lubrizol. Suitable waxes and lubricants include, for example, BYK 346 and BYK 333 available from Byk Chemie, SILWET L7500 and SILWET L7602 available from Crompton Corporation, TBF 190 and TBF 7602 available from Path Silicones, MPP620, POLYFLUO 523 and POLYFLUO 150 available from Micro Powders, Inc., LANCO 1799P available from Lubrizol, and SST3 available from Shamrock Technologies. Suitable defoamers include, for example, BYK 035 and BYK 032 available from Byk Chemie and DAPRO 880 available from Elementis.

The compositions of the present invention may include a catalyst to enhance the curing action. For example, when aminoplast compounds are used, a strong acid catalyst may be utilized. Such catalysts are well known and include, for example, p-toluene sulfonic acid ("PTSA"), dinonylnaphthalene disulfonic acid, dodecylbenzenesulfonic acid, phenol acid phosphate, monobutyl maleate, butyl phosphate, and hydroxy phosphate ester. Strong acid catalysts are often blocked, such as with an amine. Other catalysts that can be used are Lewis acids, zinc salts, and tin salts, an example of which is dibutyltin dilaurate.

The coatings of the present invention will typically comprise between 5 and 50 weight percent of the carbamated polyol, such as 15 to 35 weight percent. The crosslinker used to react with the carbamated polyol in the present compositions will typically comprise 10 to 50 weight percent of the total composition, such as 20 to 40 weight percent. In some instances increasing the amount of carbamated polyol and crosslinker will result in greater resistance. The film-forming resin, if present, will typically be present in an amount from 10 to 60 weight percent, such as 25 to 45 weight percent. Any additional additives that are included in the present compositions will typically not exceed more than 45 weight percent of the coating compositions; it will be appreciated that this number will be relatively low (i.e. <15 weight percent) for nonpigmented formulations. All weight percents referenced herein are based on total solids, unless indicated otherwise.

As noted above, it is an advantage of the present invention that the present coatings can be water-based, rather than solvent-based. "Water-based" refers to a coating in which the solvent is either all water, or predominantly water mixed with a lesser amount of cosolvent. Organic solvents can also be used if desired, such as ketones, esters, acetates, aprotic amides, aprotic sulfoxides, or aprotic amines. The solvent, whether it is water, organic solvent, or mixtures thereof, typically comprises about 35 to 75 weight percent of the total composition.

The coating compositions of the present invention are preferably subjected to conditions so as to cure the coating. Although various methods of curing may be used, heat curing is most desirable. Generally, heat curing is effected by exposing the coated article to elevated temperatures provided primarily by radiative heat sources. Curing temperatures will vary depending on the particular crosslinking agent(s), however, they generally range from 150° C. to 220° C. The curing time will also vary depending on such parameters as the components used, the thickness of the layer, and the like. Typically, curing times range from less than 1 minute to 25 minutes, such as 2 to 4 minutes.

The compositions of the present invention are particularly suitable for application to food containers. As used herein, "food container(s)" refers to metal receptacles used for holding food and/or beverages. The coating compositions may be used for either the outside or the inside of the containers.

It will be appreciated that steam processing is used in a number of food processing procedures, such as pasteurization, sterilization, and cooking the food and/or beverage products. Beverages, such as, beer, milk drinks, juice and juice drinks, are all subjected to heat treatment in the containers in which they are sold. Likewise, food products for human and animal consumption including vegetables, meats, and fruits are subjected to processing in containers in which they are sold. A short pasteurization time may be used for beverages, such as beer, which would require processing at about 80° C. for about 15 to 30 minutes, while a container of uncooked meat would require a considerably longer processing time at higher temperatures, for example 90 minutes at 125° C. to 130° C. "Steam retort" generally involves steam processing at temperatures of 100° C. to 150° C. for times of 1 to 120 minutes. "Hot fill" processing at temperatures of 80° C. to 100° C. is also used. Again, the processing times and temperatures will vary depending on the content and amount of food or beverage to be processed. As noted above, to be commercially acceptable, the coating on the container should be resistant to blush and other degradation that often results from steam retort. The present coating compositions are particularly suitable for this purpose.

Accordingly, the present invention is further directed to a method for improving retort resistance comprising applying to a food container a coating composition of the present invention; curing the composition; filling the container; and subjecting the filled container to steam retort. Any improvement in solvent resistance, resistance to discoloration, resistance to water spotting, resistance to abrasion, and/or resistance to loss of gloss constitutes an improvement in retort resistance within the present invention.

It has been surprisingly discovered that the present compositions also demonstrate superior resistance to tropical decay. As noted above, tropical decay occurs upon exposure of a food container to high ambient temperature and humidity for an extended period of time. For example, when the ambient temperature is about 80° F. (26.7° C.) or higher and the humidity is 70 percent or higher, tropical decay can be observed in as quickly as a few days. As a result of such exposure, the can coatings can become hazy, discolored, and/or suffer loss of gloss, loss of solvent resistance and/or loss of abrasion resistance. Tropical decay can be observed in both filled or unfilled cans. Accordingly, the present invention is further directed to a method for improving resistance to tropical decay on a food container coating comprising applying to a food container a coating composition of the present invention; curing the composition; and subjecting the container to a temperature of at least 80° F. and a humidity level of at least 70 percent. Any improvement in resistance to hazing, resistance to discoloration, solvent resistance, resistance to loss of gloss and/or resistance to abrasion constitutes an improvement in resistance to tropical decay within the present invention.

The present invention is further directed to a food container that has been coated with one or more compositions of the present invention. The coating, as noted above, can be applied either internally or externally on the food container.

In one embodiment the coating is applied to the exterior of the food container. The coatings can be either pigmented or unpigmented. In one embodiment, a pigmented basecoat is applied to the exterior of the food container; the food container can further comprise printing, ink and the like as desired by the can manufacturer or end user. The coating or ink used to effect printing ("printing layer") can also comprise the compositions described herein. This printing layer can then be further covered by a clear or lightly tinted topcoat, which serves to protect the printing layer during steam retort and storage. The basecoat, printing layer and/or topcoat can comprise the coatings of the present invention.

As used herein, unless otherwise expressly specified all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Thus, while various components that comprise the present invention may be described in singular terms, mixtures of these components are also within the present invention. Also, as used herein, the term "polymer" is meant to refer to oligomers and both homopolymers and copolymers; the prefix "poly" refers to two or more.

EXAMPLES

The following examples are intended to illustrate the invention, and should not be construed as limiting the invention in any way.

Example 1

2392 grams (g) of Bisphenol A-Ethylene Oxide polyol (6:1 Bis A: EO, obtained from BASF as MACOL) were charged into a glass reactor equipped with a stirrer, thermocouple and a nitrogen inlet. To this, 725 g of molten methyl carbamate and 45.20 g of tin-based catalyst (obtained from Atochem as FASCAT 4215) were added. The reaction mixture was heated slowly to 135° C. to 140° C. and methanol was distilled off using a fractionating column. The reaction was continued until 245 g of methanol were collected. The extent of transcarbamation was monitored using IR. The reaction was considered complete when the hydroxyl IR peak had disappeared. To remove the unreacted methylcarbamate, 60 g of xylene were added slowly to the resulting reaction product. The xylene was removed under vacuum while the temperature of the batch was held between 140° C. and 165° C. When most of the xylene was removed and residual methyl carbamate was less than 1 percent, the reaction product was cooled to 90° C. Seventy-nine grams of dimethylethanolamine (DMEA) and 128 g of DI water were added to lower the viscosity of the product.

Example 2

5577 g of Bisphenol A-Ethylene Oxide polyol (6:1 Bis A: EO) were charged into a glass reactor equipped with a stirrer, thermocouple and a nitrogen inlet. To this, 1704 g of molten methyl carbamate and 99.00 g of dibutyltin dilaurate were added. The reaction mixture was heated slowly to 135° C. to 140° C. and methanol was distilled off using a fractionating column. The reaction was continued until 545 g of methanol were collected. The extent of transcarbamation was monitored using IR. The reaction was considered complete when the hydroxyl IR peak had disappeared. To remove the unreacted methylcarbamate, 360 g of methyl ethyl ketone were added slowly and distilled off to remove residual methyl carbamate from the reaction mixture using vacuum and allowing the batch temperature to rise to 140° C. to 165° C. When most of the MEK has been removed and residual methyl carbamate was less than 1 percent, the reaction product was cooled to 90° C. 193 g of DMEA was added to lower the viscosity of the product.

Example 3

The procedure of Example 2 was repeated, but unreacted methyl carbamate was not removed. The resulting product had about 7 percent of residual methyl carbamate.

Example 4

A coating composition according to the present invention can be made by blending the product from Examples 1, 2 and/or 3, with a crosslinker, such as alkoxylated glycoluril, alkoxylated melamine resin or mixtures thereof. A stoichiometric amount of crosslinker to product of Examples 1, 2 and/or 3 can be used to give optimum results. Also included in the blend can be one or more film-forming resins, catalysts, adhesion promoters, wetting agents, pigments, waxes, lubricants, defoamers and the like. The components can be blended under agitation until thoroughly mixed. The composition can then be applied to food containers such as by drawdown; roll coating or other standard methods, to a dry film thickness of 1.5 to 2.5 mg/square inch. The bodies can be baked for four minutes at 400° F. in a forced air oven. Once cured, the bodies can be tested for solvent resistance according to ASTM D5402-93. The bodies treated with the composition of the present invention will show improved MEK resistance as compared with comparable coatings lacking the present carbamated polyol. The bodies can also be placed in a pressure cooker for 60 minutes at 265° F. and tested again for solvent resistance and adhesion, such as according to ASTM D3359-83. Again, the cans coated with the compositions of the present invention will have greater solvent resistance and comparable adhesion to coatings without the present carbamated polyol. Visible blush will also be worse with compositions lacking the present carbamated polyol.

Whereas particular embodiments of this invention have been described above for purposes of illustration, it will be evident to those skilled in the art that numerous variations of the details of the present invention may be made without departing from the invention as defined in the appended claims.

What is claimed is:

1. A method for improving retort resistance in a coating on a food container, comprising:
 a) applying to the exterior of the container one or more layers of a coating comprising:
  i) at least one carbamated polyol; and
  ii) at least one crosslinker comprising functional groups reactive with the carbamate functionality of (i), wherein the carbamated polyol is the reaction product of at least one aliphatic and/or aromatic polyol, at least one alkylene oxide and at least one alkyl carbamate;
 b) curing the coating to form a film on the container;
 c) filling the container; and
 d) subjecting the food container to steam retort and/or hot fill processing.

2. The method of claim 1, wherein the polyol is an aromatic diol.

3. The method of claim 2, wherein the aromatic diol has one aromatic ring.

4. The method of claim 2, wherein the aromatic diol has two or more aromatic rings.

5. The method of claim 4, wherein the aromatic diol is a bisphenol.

6. The method of claim 5, wherein the aromatic diol is Bisphenol A.

7. The method of claim 1, wherein the alkylene oxide has from 1 to 10 carbon atoms.

8. The method of claim 7, wherein the alkylene oxide has from 2 to 4 carbon atoms.

9. The method of claim 1, wherein the alkyl carbamate has from 1 to 10 carbon atoms.

10. The method of claim 9, wherein the alkyl carbamate has from 2 to 4 carbon atoms.

11. The method of claim 1, wherein the polyol is Bisphenol A, the alkylene oxide is ethylene oxide, and the alkyl carbamate is methyl carbamate.

12. The method of claim 11, wherein one mole of Bisphenol A is used for every six moles of ethylene oxide.

13. The method of claim 1, wherein the crosslinker comprises an aminoplast resin.

14. The method of claim 13, wherein the aminoplast resin comprises alkoxylated melamine resin.

15. The method of claim 13, wherein the aminoplast resin comprises alkoxylated glycoluril resin.

16. The method of claim 13, wherein the aminoplast resin comprises alkoxylated melamine resin and alkoxylated glycoluril resin.

17. The method of claim 1, wherein the coating further comprises:
 (iii) at least one film-forming resin.

18. The method of claim 17, wherein the film-forming resin comprises at least one acrylate monomer.

19. A method for improving resistance to tropical decay in a coating on a food container, comprising:
 a) applying to the exterior of the container one or more layers of a coating comprising:
  i) at least one carbamated polyol; and
  ii) at least one crosslinker comprising functional groups reactive with the carbamate functionality of (i), wherein the carbamated polyol is the reaction product of at least one aliphatic and/or aromatic polyol, at least one alkylene oxide and at least one alkyl carbamate;
 b) curing the coating to form a film on the container; and
 c) subjecting the container to a temperature of at least 80° F. (26.70° C.) and a humidity level of at least 70 percent.

20. The method of claim 19, wherein the coating further comprises:
 iii) at least one film-forming resin.

* * * * *